June 11, 1968 T. P. MARTIN 3,387,416

SEALING AND SPACING ELEMENT

Filed Oct. 28, 1965

INVENTOR

THOMAS P. MARTIN

BY *Chisholm and Spencer*

ATTORNEYS

United States Patent Office 3,387,416
Patented June 11, 1968

3,387,416
SEALING AND SPACING ELEMENT
Thomas P. Martin, West Caldwell, N.J., assignor to Pittsburgh Plate Glass Company, Pittsburgh, Pa., a corporation of Pennsylvania
Filed Oct. 28, 1965, Ser. No. 505,571
10 Claims. (Cl. 52—208)

ABSTRACT OF THE DISCLOSURE

A sealing and spacing element which permits the sealing and spacing of solid surfaces to each other without the necessity for auxiliary channels, gaskets or the like comprises an elongated strip of tacky, dirt, moisture and air-impervious sealant composition comprising an at least partially vulcanized rubbery polymer to which there is adhered a longitudinally juxtaposed strip of cellular elastomer. Preferred sealant compositions are a mixture of a polymer of a 4-carbon monoolefin and a copolymer of a monoolefin containing 4-carbon atoms and a diolefin containing 4 to 6 carbon atoms, or an ethylene-propylene-diene rubbery terpolymer. The sealing element can be employed to seal and space glass, metal, wood, plastics or other solid surfaces, such as automobile windshields to automobile bodies. A seal is obtained by applying the element between the surfaces to be sealed and applying sufficient pressure to at least partially compress the element.

---

This invention relates to sealing elements suitable for use in sealing and spacing various structures, such as automotive windshields, and more particularly to such sealing elements comprising a strip of an adhesive material to which there is adhered a strip of cellular elastomer.

In sealing solid surfaces to each other, a common expedient has been to utilize a channel member made of rubber. For example, an automobile windshield is ordinarily applied by fitting the glass into a channel along with a sealing compound, so as to space the glass from the automotive body while attaining a water-tight seal. Such methods have been relatively satisfactory, but suffer from inherent disadvantages in fabrication, appearance and use.

The sealing elements of this invention permit the sealing and spacing of solid surfaces to each other, including the application of glass to metal bodies, without the necessity for auxiliary channels, gaskets or the like. For example, these sealing and spacing elements, in the form of an elongated, preformed tape, are used to space and seal the periphery of a glass windshield, back-light, or quarter-panel to a metal flange, or in sealing glass or metal panels in architectural applications, forming a permanently resilient seal, which is impervious to dirt, air, moisture and vapor. The sealing elements herein can also be employed to seal and space glass to metal or to glass, wood, plastics, or other solid surface in any glazing operation, and in sealing any of the above materials to each other as well.

The sealing and spacing elements of this invention comprise a tacky, moistureproof sealant material comprising a partially vlucanized rubbery polymer, and a cellular elastomer adhered to the sealant. These sealing and spacing elements and their use are illustrated by the drawings herein, in which FIGURES 1 and 2 are cross-sectional views or two preferred embodiments of the sealing elements of the invention, FIGURE 3 shows an automotive windshield sealed to a metal body, and FIGURE 4 shows a cross-section of the windshield of FIGURE 3 with the sealing element in place.

Figure 1:
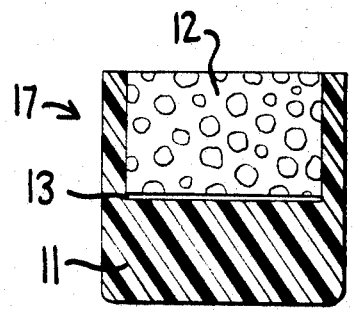

The sealing and spacing element 17 of FIGURE 1 is composed of a shaped body of a sealant composition 11 to which there is attached a strip of cellular elastomer 12; the cellular elastomer may have a backing 13 made of cloth or other material.

Figure 2:
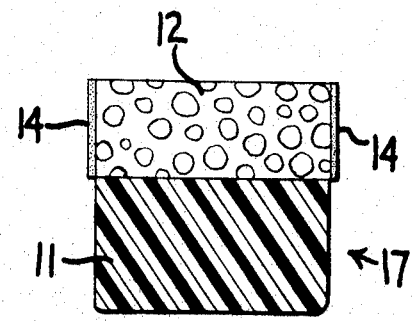

FIGURE 2 shows another type of preferred sealing and spacing element 17, in which the strip of cellular elastomer 12 extends beyond the surface of the sealant composition 11; in this embodiment, it is desirable to coat the extended sides of the cellular elastomer with a pressure-sensitive or other reactivatable adhesive 14.

Figure 3:
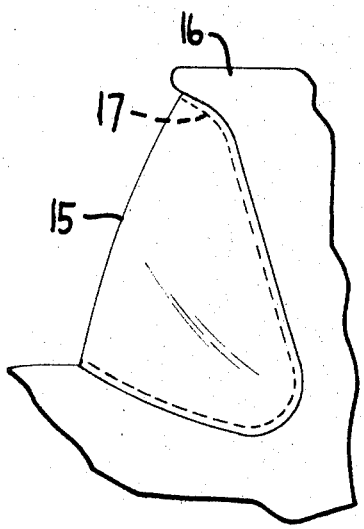
Figure 4:
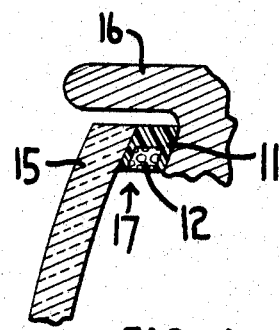

The windshield structure of FIGURE 3 comprises a glass windshield 15 which is attached to a metal body 16 by means of the sealing and spacing element 17.

FIGURE 4 shows in cross-section the top portion of the windshield structure of FIGURE 3 with the sealing and spacing element of FIGURE 1 in place. As shown, the glass windshield 15 is adhered to and spaced from the metal body 16 with the sealing and spacing element 17 made up of the sealant composition 11 and the cellular elastomer 12.

The use of the sealing and spacing elements provides several significant advantages over gasket or channel type sealing systems, and over sealing elements not containing a cellular elastomer component as described. For example, among the advantages attained are:

(1) The composite sealing and spacing element is more easily compressible and thus a seal is attained easily and without the necessity for difficult installation techniques.

(2) The sealing and spacing element retains expulsion under compression since the cellular component permits compression without bulging and exposure of sealant.

(3) A full seal is attained at lower compressive loads, having increased load support strength.

(4) The seal and spacing are maintained by the constant pressure from the compressed cellular member; thus the normally used spacers are not required with these sealing elements.

(5) The seal and spacing maintained even at relatively high temperatures, e.g., in warehouses, tropical climates, etc., because the low thermal plasticity of the cellular elastomer keeps the element essentially undeformed at these conditions, even under load.

(6) The combination gives a neat, uniform appearance, and decorative effects are easily provided since the exposed surface is essentially cellular elastomer, which can be colored if desired and which does not become dirty and discolored to the extent the sealant does.

(7) The composite sealing and spacing element is resilient and dimensionally stable, and does not easily distort during handling and assembly.

The sealant utilized in the sealing and spacing elements herein can be any tacky, dirt, moisture and air impervious composition comprising as a major component and at least partially vulcanized rubbery polymer. Various rubbery polymers can be employed, including natural rubber, styrene-butadiene rubber, polychloroprene, acrylic rubber, polybutadiene rubber, chlorosulfonated polyethylene, polyisoprene, butadiene-acrlonitrile rubber, polysulfide rubber, urethane rubber, and the like. It is only necessary that the rubbery polymer be vulcanizable and that the adhesive be compounded to provide a tacky, moistureproof composition. Mixtures of rubbery polymers can also be used.

One class of preferred sealant compositions are those based on a blend of a polymer of a 4-carbon monoolefin and a copolymer of a 4-carbon monoolefin and a diolefin having 4 to 6 carbon atoms. The polymer of a 4-carbon monoolefin includes polymers of isobutylene, butene-1 and butene-2, as well as mixed polymers of these compounds, such as polymerized unsaturated 4-carbon atom fractions obtained from the distillation of petroleum. The polymer preferably should have a molecular weight between about 300 and 15,000.

The copolymers employed in this type of compositions are those often termed "butyl rubbers" and include rubber-like polymeric substances produced by the copolymerization of a monoolefin, such as isobutylene, and a diolefin, such as butadiene, isoprene, dimethylbutadiene, pentadiene and piperyline. These copolymers contain from about 70 percent to about 99.5 percent by weight of the monoolefin and from about 30 percent to about 0.5 percent by weight of the diolefin, and have a molecular weight between 25,000 and about 100,000. (Molecular weights herein are Staudinger molecular weights which are determined by Staudinger's equation, in which the molecular weight is a function of intrinsic viscosity.) The copolymer can also contain chlorine along with the unsaturated linkages from the diolefin. Such chlorinated butyl rubbers are of particular value for many applications.

The proportion of polymer and copolymer in the sealant composition can be varied; usually, the higher the molecular weight of the polymer of a 4-carbon monoolefin, the more of it that is required to obtain the desired properties in the sealant. In most cases, from about 45 to about 210 parts of the polymer are combined with 100 parts of the butyl rubber copolymer.

Another class of preferred sealant compositions are those in which the rubber polymer is an ethylene-propylene-diene terpolymer rubber. These terpolymer rubbers are made by the interpolymerization of ethylene, propylene and a small amount of diene in the presence of a transition metal catalyst, typical dienes employed being dicyclopentadiene, 1,4 - hexadiene, 5 - alkenyl-2-norbornenes, 2-alkyl-norbornadienes, 5-methylene-2-norbornene, and the like. The terpolymers have a relatively high molecular weight, i.e., above 20,000 and usually above 50,000. Examples of such terpolymers and methods of producing them are described in several patents, among them are United States Patents Nos. 3,000,866; 3,063,973; 3,093,620, and 3,093,621; and British Patents Nos. 880,904 and 957,105.

In order to achieve the desired properties in the sealant composition, it is essential to at least partially vulcanize the rubbery polymer. Vulcanization provides, among other properties, a degree of resiliency of the sealant which enables the sealing element to recover its desired shape upon extension and to resist deformation when heated, and restrains flow or displacement under conditions in which low loads are applied for long times, as in use or storage. This is particularly necessary in sealing operations in which the handling of the sealant or movement of the sealed structures could otherwise result in its deformation.

Various vulcanizing systems can be employed, using such materials as paradinitrosobenzene, sulfur, zinc dibutylthiocarbamate (butyl Zimate), 2-mercaptobenzothiazole, paraquinone dioxime, lead oxide, zinc oxide, magnesium oxide, benzothiazyl disulfide, tetramethylthiuram monosulfide, tetramethylthiuram disulfide, and 4,4-dithiodimorpholine. Polyisocyanates, such as toluene diisocyanate, can also be employed, as can various resinous vulcanizing agents, such as para-substituted phenolic resins, for example, the alkaline catalyzed condensate of p-bromomethylphenol with excess formaldehyde.

The amount of vulcanizing agent can be varied widely, depending upon the particular agent utilized. In most cases, from about 0.1 percent to about 15 percent by weight of the rubbery polymer is employed, depending on the type of curing system and the type of polymer employed.

While it is possible to cure small amounts of the sealant mixture under static conditions, with larger amounts it is preferable that the vulcanizaion be completed in a mill or mixed. By adding the vulcanizing agent during milling or mixing, a separate curing operation is avoided and the vulcanizing agent can be thoroughly dispersed before vulcanization begins. For this reason also, it is desirable that the mixture be cooled, if necessary, to a temperature below about 225° F. before the vulcanizing agent is added.

Other optional ingredients may also be added to the sealant composition. For example, small amounts, e.g., about 1 percent to about 15 percent by weight, of zinc oxide can be added to aid in the mixing of the mixture and to increase the resistance of the sealant to deterioration upon exposure to ultraviolet light. Excessive amounts of zinc oxide should be avoided, however, because of possible adverse effects upon the adhesiveness and moisture resistance of the composition.

Similarly, it is often desirable to incorporate carbon black in the composition in order to attain a more pleasing and uniform appearance, and to reinforce and stabilize the material. Carbon black may also be used to aid in resistance to aging caused by ultraviolet light, and for this purpose, as little as 1 percent by weight can be effective.

Still other additives can be utilized in the sealant compositions within the scope of the invention, such as, for example, fillers and similar modifiers which may be used to slightly alter the flow properties of the sealant. Other additives may include various softeners and tackifiers, for example, resins such as thermoplastic para-substituted phenol-formaldehyde resins, or oils such as naphthenic or paraffinic petroleum oils. Other softeners and tackifiers include diisooctyl phthalate; adipates, such as diisooctyl adipate; rosin derivatives, such as hydrogenated rosin esters; fatty acid esters, such as butyl stearate; polyterpene resins, such as the thermoplastic terpene resins composed chiefly of polymers of pinene; coumaroneindene resins; low molecular weight amorphous polyolefins, such as low molecular weight polypropylene; petroleum hydrocarbon derived thermoplastic resins, such as dicyclopentadiene polymers and copolymers, and alphamethylstyrene polymers.

The cellular elastomer component of the sealing and spacing elements herein can be unicellular or open-celled and porous, with varying cell size and structure. While density is not critical, the cellular elastomers utilized typically have a density between about 5 and about 35 pounds per cubic foot, and can be made of any resilient, flexible, elastomeric material. Included are foams or sponge made of such materials as vinyl halide polymers and copolymers, vinylidene halide polymers, polyesters, polyurethanes, polyamides and similar polymeric substances which can be provided in cellular, elastomeric form. It is preferred to use foams or sponge made of a rubbery polymer, such as polymers of butadiene, isoprene, chloroprene, ethylene-propylene rubber copolymers; butadiene-styrene copolymers; butadiene-acrylonitrile copolymers; isoprene-isobutylene copolymers; silicone rubbers; and the like. Neoprene sponge is a specific preferred material.

The shape of the cellular elastomer component is not critical, but in most cases will be governed by the desired application to which the sealing and spacing element is to be put. Usually, both the sealing element and the cellular elastomer are substantially rectangular, but round, trapezoidal, triangular or other shapes can also be employed. It is preferred that the cellular elastomer have a relatively planar surface exposed, but the portion adhered to the sealant can be of virtually any desired shape.

The relative size of the cellular elastomer portion may vary and can be very low, depending upon factors such as the desired spacing of the surfaces, the extent of overlap, its compressibility, the desired load capacity and the configuration of the structure to be sealed. Similarly, the proportion of the elastomer in relating to the over-all sealing element can be very large provided there is sufficient sealant composition to provide a seal which is stable under compression and the anticipated load. Obviously, the total size of the sealing element can be varied to suit any particular application.

In some instances, it is desirable to include a backing member of flexible, non-extensible sheet material between the cellular elastomer and the sealant. The backing is preferably water-resistant and can be disposed between the elastomer and the sealant throughout their interface or at only a portion, such as at the bottom of an elastomer strip which is rectangular in cross-section. Various materials can be used for the backing, including paper and resin-impregnated paper; cellulose esters, such as cellulose acetate; polyvinylidene chloride; polyethylene terephthalate; hydrochlorinated rubber (Pliofilm); and various types of cloth backings of natural or synthetic fibers, including cotton, nylon, glass, jute, rayon, and the like.

It is often desirable that the elastomer be coated on three sides with adhesive, leaving one side uncoated. In some embodiments of the invention (e.g., that shown in FIGURE 1), the sealant composition itself provides such a coating over the elastomer. In other cases, the cellular elastomer extends beyond the surface of the sealant, and in these instances it is sometimes preferred to coat one or both of the sides of the elastomer with an adhesive. Any adhesive which is normally tacky and pressure-sensitive, or which is reactivatable to a tacky state by heat or solvent, can be used for this purpose. Such adhesives include those based on natural or synthetic rubbers, polyvinyl ethers, polyacrylates, and the like. Numerous examples of suitable adhesives of this type can be found in the art, for example, in the book "Handbook of Adhesives," published by Reinhold Publishing Corporation of New York in 1962.

Set forth below are several examples illustrating the nature of the sealant compositions employed in the sealing and spacing elements described herein. These are produced by conventional techniques. Generally, the components, except for the vulcanizing agent, are homogeneously mixed on a two-roll, rubber compounding mill at a temperature between about 150° F. and 200° F. The vulcanizing agent is then added and mixed thoroughly, and the mixture allowed to heat sufficiently to permit the vulcanization reaction to take place. Milling is then continued for a time sufficient for the desired vulcanization to take place.

EXAMPLE A

Parts by wt.
Butyl rubber (copolymer of isobutylene and 1.3 percent isoprene, molecular weight 40,000) -------- 100
Polybutenes [1] (average molecular weight about 2100) ---------------------------------------- 50
Zinc oxide ---------------------------------- 5.0
Carbon black ------------------------------- 25
Paradinitrosobenzene ------------------------ 1.0

[1] Mixture of polymerized petroleum fractions made up essentially of isobutylene, butene-1 and butene-2

EXAMPLE B

Parts by wt.
Terpolymer rubber [1] ------------------------- 100
Polyisobutylene (molecular weight about 10,000) -- 25
Stearic acid -------------------------------- 6
Zinc oxide ---------------------------------- 5.0
Carbon black ------------------------------- 150
Tackifying resin [2] --------------------------- 15
Paraffinic mineral oil (SUS viscosity 155 at 210° F.) ---------------------------------- 50
Sulfur -------------------------------------- 0.15
2-mercaptobenzothiazole --------------------- 0.5
Tetramethylthiuram monosulfide -------------- 0.5

[1] Terpolymer of ethylene, propylene and 1,4-hexadiene having a Mooney viscosity of 40 at 250° F.
[2] Phenol-modified coumarone-indene resin having a melting point of about 10° C., a viscosity of 235 poises at 25° C. and a specific gravity of 1.08.

EXAMPLE C

Parts by wt.
Chlorinated copolymer of isobutylene and 1.5 percent isoprene having a molecular weight of about 40,000 ---------------------------------- 100
Polyisobutylene (molecular weight about 10,000) -- 160
Carbon black ------------------------------- 25
Zinc oxide ---------------------------------- 3
Phenolic resin [1] ----------------------------- 4

[1] Heat-reactive methylol-containing alkyl-substituted phenol-formaldehyde resin.

Several specific examples of preferred sealing and spacing elements within the invention are as follows:

EXAMPLE 1

A particularly desirable embodiment of the invention comprises the sealant composition of Example A above and a cellular elastomer made of closed cell neoprene sponge having a density of 20 pounds per cubic foot, a compression set factor of 40 percent, and a maximum water absorption of 5 percent. The sealing element is rectangular in cross-section, with over-all dimensions of 3/8 inch by 3/8 inch. The neoprene sponge is also rectangular in cross-section, 5/16 inch by 1/8 inch, and is disposed in a corresponding longitudinal depression in the strip of adhesive, with 1/32 inch of sealant over each side of the cellular elastomer. The sealant adheres well to the elastomer. The resulting sealing element is similar to that shown in FIGURE 1. The sealing element, as described, has been employed to seal various solid surfaces to each other with highly advantageous results. Sealing is achieved by placing the sealing element between the surfaces and applying sufficient pressure to at least partially compress the sealing element.

For example, a glass windshield was attached to an automobile body by placing a continuous length of the above-described sealing element around the periphery of the pinch-weld flange, and then pressing the windshield against the sealing element. Pressure of 10 pounds per square inch was applied for 1 minute. The vertical dead weight of the glass was supported by two rubber setting blocks, but no channel members, gaskets, glass-metal spacers, or the like were employed, nor was the windshield sealed by any other product or means. The windshield was firmly and securely attached to the metal flange, and the seal between the glass and the metal was uniform and neat, and was impervious to dirt, air, moisture and vapor. Its structural properties and weather-tightness were maintained under severe climatic and field loading conditions.

EXAMPLE 2

Another desirable embodiment of the invention comprises a rectangular strip of the adhesive composition of Example A 1/4 inch high and 3/8 inch wide. To one longitudinal 3/8 inch wide surface of the adhesive strip there is pressed a rectangular strip of neoprene sponge (as in Example 1) 3/8 inch wide and 1/8 inch high. On each side of the neoprene sponge strip there is a 3 mils thick film of a pressure-sensitive adhesive containing 100 parts of a terpolymer of 55 percent of 2-ethylhexyl acrylate, 40 percent vinyl acetate and 5 percent of acrylic acid, and 25 parts of the pentaerythritol ester of stabilized rosin. A solvent (e.g., toluene) or heat reactivatable adhesive which can be used instead contains 100 parts of neoprene, 30 parts of heat-reactive phenolic resin from the alkaline-catalyzed reaction of p-5-butylphenol with excess formaldehyde, 2 parts of zinc oxide and 5 parts of magnesium oxide. The sealing element obtained corresponds to that shown in FIGURE 2. When employed in the manner described in Example 1, an excellent seal with good properties was obtained.

Comparable results are attained by substituting other sealant compositions of the class described such as that of Examples B and C above, for the composition of Example A in the sealing elements described in Examples 1 and 2 above. Also, other cellular elastomers, including various foam rubbers and other resilient, flexible, cellular polymeric materials, can be substituted for the neoprene sponge in the above-described sealing elements. As indicated above, various shapes and configurations of the cellular elastomer and the sealing element can be utilized essentially in the same manner, and, if desired, the element can include a backing member of cloth or other sheet material.

According to the provisions of the patent statutes, there are described above the invention and what are now considered to be its best embodiments. However, within the scope of the appended claims, it is to be understood that the invention can be practiced otherwise than as specifically described.

I claim:

1. An elongated composite sealing and spacing element adapted for use in attaching the periphery of a glass member such as a windshield to a base member, said element comprising
    (a) a sealant component made of a tacky, dirt, moisture and air-impervious sealant composition comprising an at least partially vulcanized rubbery polymer, said sealant component being in the form of an elongated strip having interconnected continuous surfaces including spaced side surfaces adapted to secure and engage said members and oppositely spaced upper and lower surfaces transverse to said side surfaces; and
    (b) a cellular component made of a cellular, resilient, elastomeric foam or sponge, said cellular component being longitudinally juxtaposed with said sealant component and bonded thereto along one of said upper and lower surfaces thereof;
whereby said composite sealing and spacing element when positioned between said glass member and said base member provides a resilient, dimensionally stable seal which is impervious to dirt, air, moisture and vapor.

2. The sealing and spacing element of claim 1 in which said sealant composition comprises an at least partially vulcanized mixture of (a) a polymer of a 4-carbon monoolefin, and (b) a copolymer of a monoolefin containing 4 carbon atoms and a diolefin containing 4 to 6 carbon atoms.

3. The sealing and spacing element of claim 2 in which said mixture contains (a) from about 45 to about 210 parts by weight of a polymer of a 4 carbon atom monoolefin having a molecular weight between 300 and 15,000, and (b) 100 parts by weight of a copolymer of from about 70 to about 99.5 parts by weight of a monoolefin containing 4 carbon atoms and from about 0.5 part to about 30 parts by weight of a diolefin containing 4 to 6 carbon atoms, said copolymer having a molecular weight between 25,000 and about 100,000.

4. The sealing and spacing element of claim 1 in which said rubbery polymer is an ethylene-propylene-diene terpolymer rubber.

5. The sealing and spacing element of claim 4 in which said terpolymer is a terpolymer of ethylene, propylene and 1,4-hexadiene.

6. The sealing and spacing element of claim 1 in which said cellular component is sponge rubber.

7. The sealing and spacing element of claim 1 in which said cellular component is neoprene sponge.

8. The sealing and spacing element of claim 1 in which said cellular component is disposed in a longitudinally extending depression in said sealant component.

9. The sealing and spacing element of claim 1 in which the sides of said cellular component extend beyond the surface of said sealant component.

10. The sealing and spacing element of claim 9 in which the extended sides are coated with a layer of adhesive.

References Cited
UNITED STATES PATENTS

| | | | |
|---|---|---|---|
| 2,781,561 | 2/1957 | Gifford et al. | 52—397 |
| 2,974,377 | 3/1961 | Kunkle | 260—889 |
| 3,059,292 | 10/1962 | Harris | 49—492 |
| 3,155,204 | 11/1964 | Campbell et al. | 52—208 |
| 3,204,377 | 9/1965 | Johnson | 52—395 |
| 3,261,888 | 7/1966 | Cornell | 260—80.5 |

KENNETH DOWNEY, *Primary Examiner.*